United State

[11] 3,604,251

| [72] | Inventor | Norman E. Dixon<br>Pasco, Wash. |
| [21] | Appl. No. | 817,505 |
| [22] | Filed | Apr. 18, 1969 |
| [45] | Patented | Sept. 14, 1971 |
| [73] | Assignee | The United States of America as represented by the United States Atomic Energy Commission |

[54] A CAPACITIVE ULTRASONIC DEVICE FOR NONDESTRUCTIVELY TESTING A SAMPLE
11 Claims, 6 Drawing Figs.

[52] U.S. Cl. .................................................. 73/67.7,
179/111, 317/261
[51] Int. Cl. ............................................. G01n 29/04
[50] Field of Search........................................... 310/6;
73/67.5–67.9, 71.5, 71.4; 340/8; 317/249, 261, 258;
179/106, 111

[56] References Cited
UNITED STATES PATENTS

| 1,471,547 | 10/1923 | Chilowsky et al............. | 73/67.5 X |
| 2,625,035 | 1/1953 | Firestone...................... | 73/67.8 |
| 3,136,867 | 6/1964 | Brettell......................... | 179/111 |
| 3,319,141 | 5/1967 | Cariou et al.................. | 317/258 |

OTHER REFERENCES

Bordoni et al., Generalization D'Une Methode Electrostatic Pour La Mesure Ultrasonore des Constantes Elastiques, etc., Acustica, Vol 4, 1954, p. 184–187.

Primary Examiner—Richard C. Queisser
Assistant Examiner—John P. Beauchamp
Attorney—Roland A. Anderson ABSTRACT: In an apparatus for ultrasonically testing a sample, a plurality of electrodes and dielectric members are mounted in alternate layered arrangement in pressure engagement with the sample. The electrodes adjacent the sample are maintained at a reference potential and means apply a bias voltage relative said reference potential to the electrode furthermost of said sample. A plurality of amplifiers combine the output voltages relative said reference potential of the others of said electrodes to provide a measure of ultrasound in the sample.

PATENTED SEP 14 1971
3,604,251
SHEET 1 OF 3
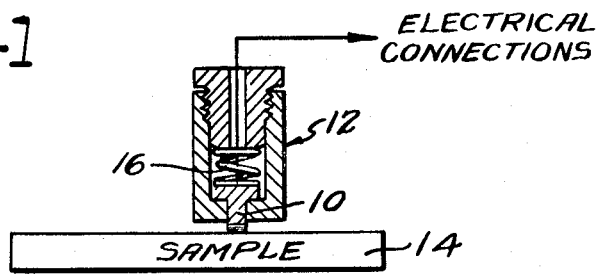
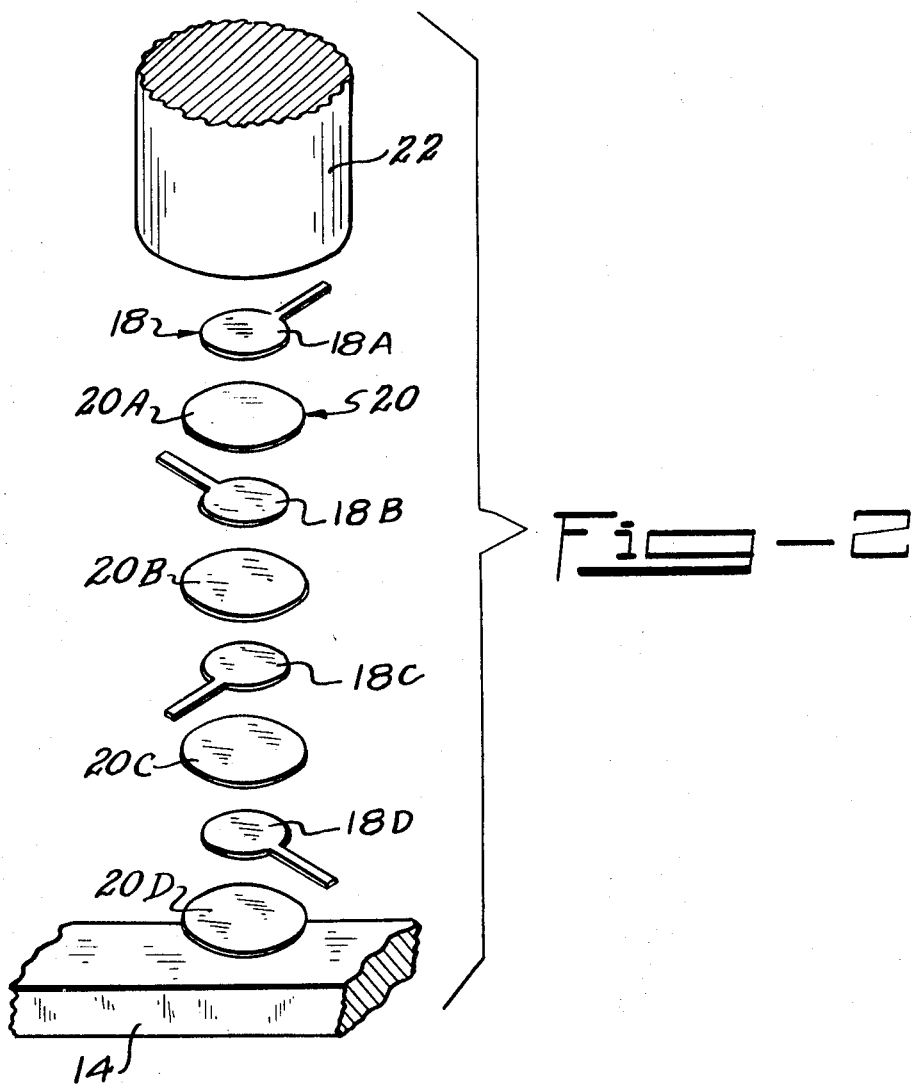
Inventor
Norman E. Dixon
Attorney

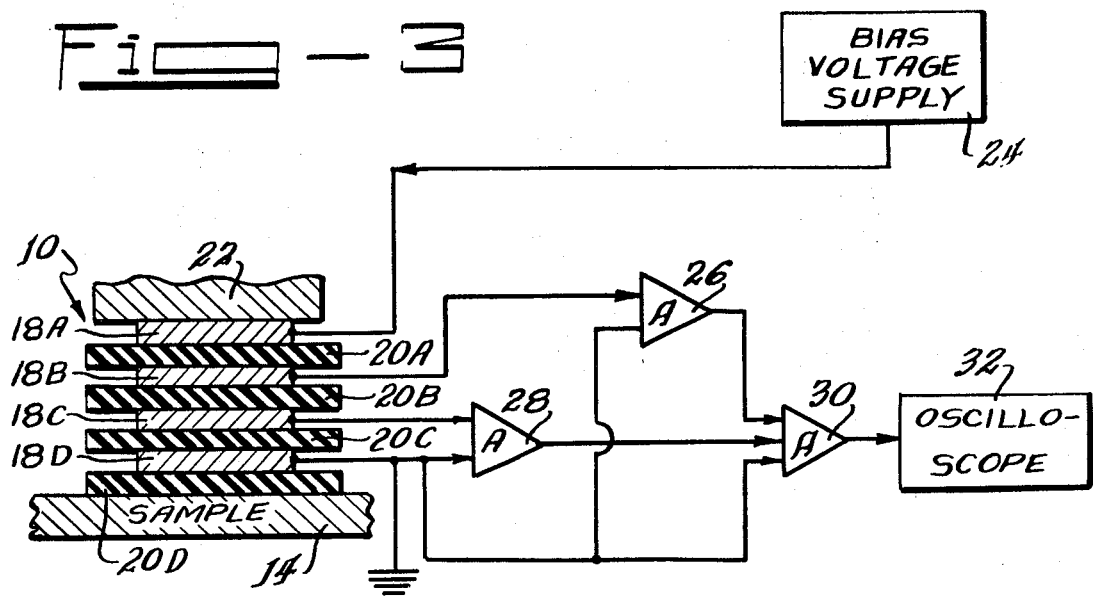
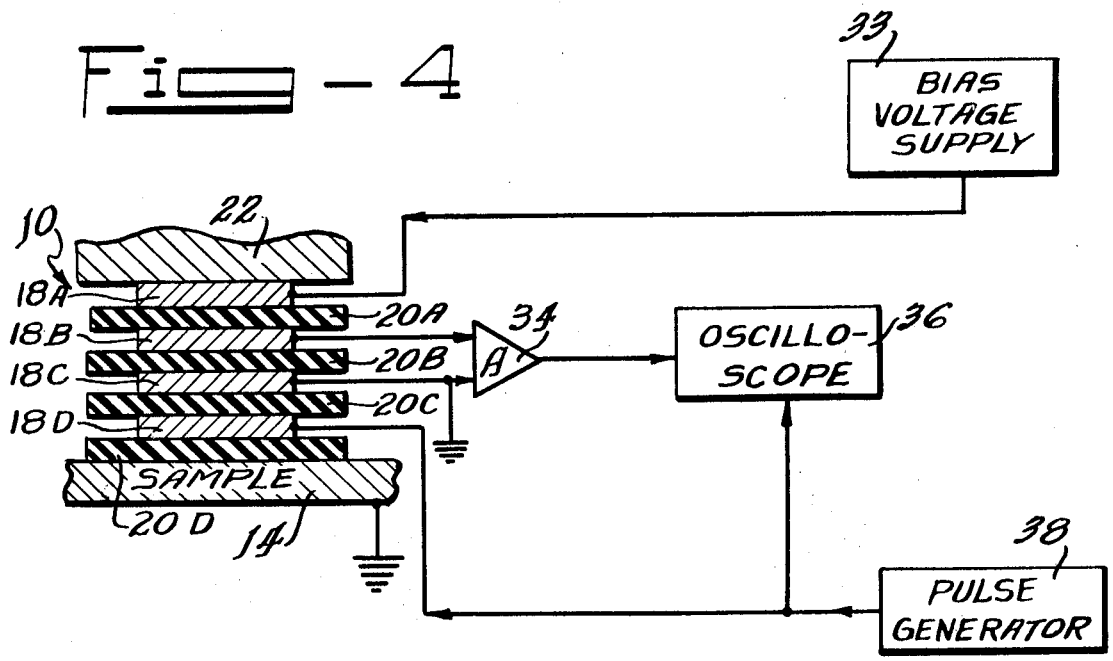

Inventor
Norman E. Dixon
Attorney

A CAPACITIVE ULTRASONIC DEVICE FOR NONDESTRUCTIVELY TESTING A SAMPLE

CONTRACTUAL ORIGIN OF THE INVENTION

The invention described herein was made in the course of, or under, a contract with the United States Atomic Energy Commission.

BACKGROUND OF THE INVENTION

The present invention relates to ultrasonic devices for nondestructively testing a sample and more particularly to electrostatic ultrasonic devices for nondestructively testing samples.

Ultrasound provides a convenient and rapid tool for determining the physical properties and conditions of a sample without destroying the sample. For example, in the nuclear reactor art, it is desirable to monitor for and locate crack initiation and/or growth in reactor pressure piping. To achieve this result, measurements are made of acoustic signals emitted by the piping as it deforms and fractures. The frequency, sensitivity and extended period operating temperatures encountered in these measurements require extremely broad frequency range response, high sensitivity and extended period high operating temperature capability for the ultrasonic transducers being used. Conventional piezoelectric or magnostrictive transducers do not meet these requirements. The electrostatic ultrasonic transducer as taught by Steffens et al. in application Ser. No. 810,389, filed Feb. 24, 1969, entitled "A Capacitor Type Ultrasonic Transducer" (S-31,778) exhibits high operating temperature and broad frequency response capability. However, in its present state, its sensitivity is somewhat limited.

It is therefore an object of the present invention to provide an improved capacitive ultrasonic nondestructive testing device.

It is another object of the present invention to provide a capacitive ultrasonic nondestructive testing device having high sensitivity.

Other objects of the present invention will become more apparent as the detailed description proceeds.

SUMMARY OF THE INVENTION

In general, the present invention comprises a plurality of electrodes and dielectric members in alternate layered arrangement and in pressure engagement with a sample. Means are provided to maintain one of the electrodes at a reference potential while applying a bias voltage relative said reference potential to another of said electrodes. Means are also provided for combining the output voltages relative said reference potential of the others of said electrodes to provide a measure of ultrasound in said sample.

BRIEF DESCRIPTION OF THE DRAWINGS

Further understanding of the present invention may best be obtained from consideration of the accompanying drawings wherein:

FIG. 1 is a schematic drawing showing a transducer according to the present invention in pressure engagement with a sample.

FIG. 2 is an exploded schematic drawing of the transducer of FIG. 1.

FIG. 3 is a schematic drawing of a receiver transducer for the practice of the present invention.

FIG. 4 is a schematic drawing of a receiver-transmitting transducer for the practice of the present invention.

In FIGS. 1 and 2 a transducer 10 for the practice of the present invention is shown. FIG. 1 shows the transducer 10 mounted in a holder 12 in spring-loaded engagement with the surface of a sample 14 being tested. The holder 12 is designed to accept the transducer 10 while the spring 16 therein maintains the pressure of the transducer 10 on the surface of the sample 14. Further appreciation of the structure of the transducer 10 may be obtained by referring to the exploded view thereof in FIG. 2. The transducer 10 comprises a plurality of thin-film electrodes 18 in alternate layered arrangement with a plurality of thin-film dielectric members 20. The dielectric members 20 are of larger diameter than the electrodes 18 to provide high electrical isolation therebetween and are supported together with the electrodes by a nonconductor substrate 22. Electrical connections are made to the electrodes 18 in a rotationally displaced orientation to avoid electrical contact between electrodes.

Figure 6:
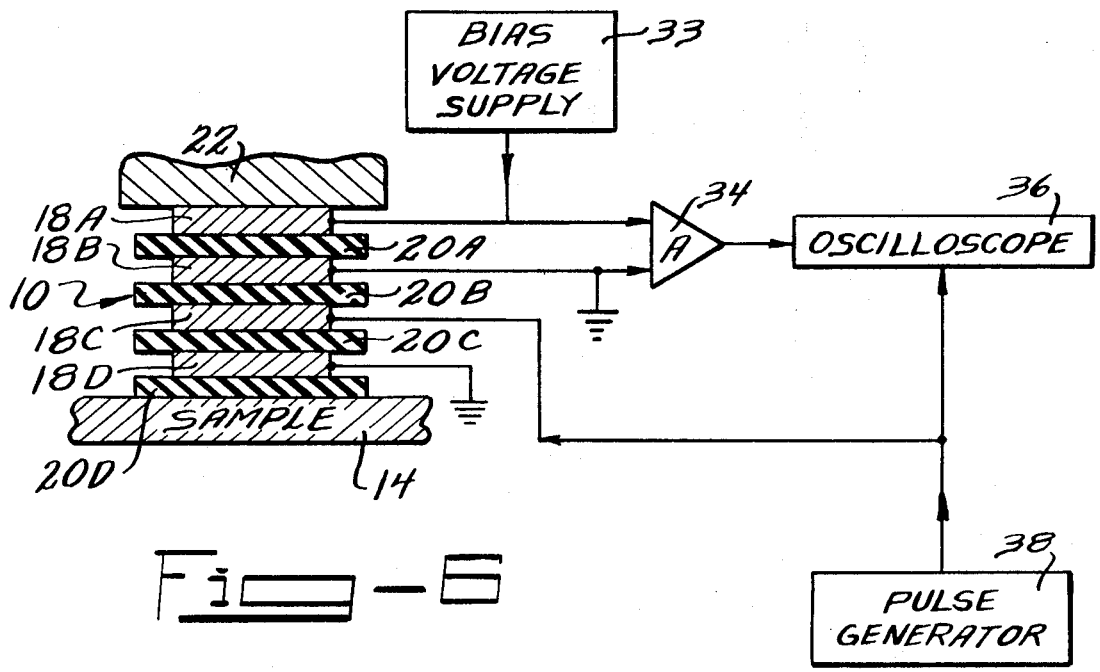
FIG. 6 is a schematic drawing of a receiver-transmitting transducer for the practice of the present invention.

For the practice of the present invention it will be appreciated that the substrate 22 may be of an electrically conductive material and, if such is the case, it may then form the electrode 18A. Further, if the specimen is electrically conductive, it may form the electrode 18D. For the present invention, it has been found that the electrodes 18 may be of a hard conductor material such as iridium and preferably should have a thickness of from 800 to 1500 A. The dielectric members 20 may be of a material such as silicon monoxide, silicon dioxide, zirconium oxide, aluminum oxide, tungsten oxide, boron nitride or magnesium oxide and preferably are of a thickness from 1500 to 3000 A. The substrate 22, if a nonconductor, may be a hard smooth dielectric material such as ruby or zirconium oxide. The electrodes and dielectric members are deposited on the substrate in thin films of the thickness herebefore described using conventional sputtering, electron gun, or resistance-heating vapor-deposition techniques.

Turning to FIG. 3, the transducer of FIG. 2 is shown connected electrically for operation according to the present invention as a receiver-transducer. To facilitate understanding, the transducer 10 is shown without holder 12. The electrode 18D adjacent the sample 14 is maintained at a reference potential (electrical ground). A voltage supply 24 provides a DC bias to electrode 18A. Amplifiers 26 and 28 amplify voltages, relative the reference potential of electrode 18D, appearing on electrodes 18B and C, respectively. Amplifier 30 additively combines the outputs of amplifiers 26 and 28 and feeds them to a display oscilloscope 32. The amplifiers 26, 28 and 30 are conventional high-impedance, capacity-coupled input, low-noise amplifiers.

Figure 5:
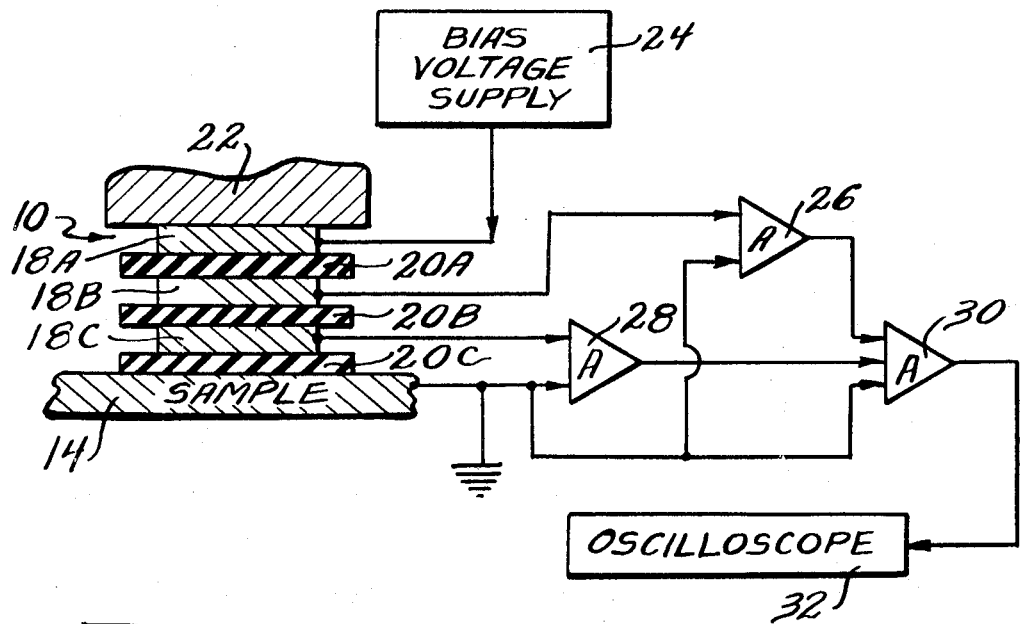
FIG. 5 is a schematic drawing of a receiver transducer for the practice of the present invention.

In operation, elastic waves traveling through the sample 14 cause to be generated between the electrodes 18C and D and 18B and D voltages which, when combined as shown, provide a measure of such elastic waves. For optimum results, it has been found that the bias voltage applied to the electrode 18A should be approximately two-thirds the dielectric breakdown voltage of the members 20. The closer the bias voltage is maintained to the breakdown voltage, the higher the efficiency will be of the transducer 10. It is also to be noted that the pressure engagement between the transducer 10 and the sample 14 should be sufficient to insure good ultrasonic coupling while not destroying the transducer. A pressure of 3 grams was used for an effective 3-mil-diameter transducer area. Using the illustrated four-electrode transducer construction shown in FIGS. 2 and 3, the output therefrom was approximately 100 times greater than the transducer using single-dielectric two-electrode construction. It will be appreciated that for the embodiment of FIG. 3, where the sample 14 is electrically conductive, then it may replace the electrode 18D and the sample is then maintained at the reference potential such as electrical ground as shown in FIG. 5. Further, where the substrate 22 is electrically conductive, it may replace the electrode 18A and the bias voltage is applied thereto. The dielectric member 20 serves to inhibit oxidation of the thin-film electrode 18D.

The transducer of FIG. 2 may be operated in the receive-transmit mode when connected as shown in FIG. 4 for an electrically conductive sample 14. In FIG. 4 the electrode 18C is maintained at a reference potential such as electrical ground.

A voltage supply 33 applies a DC bias voltage to the electrode 18A and an amplifier 34 amplifies voltages appearing between electrodes 18B and C and feeds them to an oscilloscope 36. The electrically conductive sample 14 is also maintained at a reference potential such as electrical ground and a pulse generator 38 applies a transmit excitation pulse to the electrode 18D. The amplifier 34 is a conventional high-impedance, capacity-coupled input, low-noise amplifier and the pulse generator 38 is a conventional low-impedance, high-current device.

In operation, the output pulse from the generator 38 applied to the electrode 18D induces pulsed elastic waves to flow in the sample 14. Reflections of these pulsed elastic waves are detected by the transducer 10 and appear as voltages between the electrodes 18B and C to be displayed via amplifier 34 on oscilloscope 36. The electrical grounding of electrode 18C between the transmit electrode 18D and receive electrode 18B provides partial shielding and decoupling of the transmitter pulse from the receive electrode 18B to improve recovery time of amplifier 34 immediately after transmission for high surface resolution. With the embodiment of FIG. 4 the output of amplifier 34 was approximately 40 times greater than the conventional two-electrode single-dielectric transducer.

The aforedescribed embodiment of FIG. 4 was used with an electrically conductive sample 14. Where the sample 14 is not electrically conductive as in FIG. 6, then the electrode 18D adjacent the sample 14 is maintained at a reference potential such as electrical ground, electrode 18C is connected to the pulse generator 38 and electrode 18B is maintained at a reference potential such as electrical ground, the amplifier 34 is connected between electrodes 18A and B and the DC bias is maintained on electrode 18A.

It will be appreciated that the present invention is not limited to the structure shown in the aforedescribed embodiments of FIGS. 3 and 4. The number of dielectric members and electrodes in the transducer 10 may differ therefrom. For such structures the electrodes are combined as follows. Where the transducer is used in the receiving mode, the electrode adjacent the sample (or the sample, if electrically conductive) is maintained at the reference potential such as electrical ground while a DC bias is applied to the electrode furthermost from the sample. Amplifiers are connected to additively combine the voltages appearing on the remainder of the electrodes with respect to the reference potential of the electrode adjacent the sample (or the sample, if the sample is electrically conductive and used as an electrode). Where the transducer is used in a receive-transmit mode, the first and third electrodes adjacent the sample are maintained at a reference potential such as electrical ground while the transmit-pulse generator is connected to the second electrode therebetween. The DC bias is applied to the furthermost electrode from the sample and amplifiers additively combine the voltages appearing across the remainder of the electrodes with respect to the reference potential. In this mode, if the sample is electrically conductive, it may be used in place of the first electrode as described. Improved sensitivity for the transducer has been found as the number of electrodes in the transducer are increased.

Where the transducer is being used in the receive mode, it has been found that relatively soft dielectric materials, such as silicon monoxide or silicon dioxide, give the optimum performance. Where the transducer is operated in a transmit mode, the dielectric materials exhibiting optimum results are the hard materials, such as zirconium or aluminum oxides.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. A capacitive ultrasonic device for nondestructively testing a sample comprising:
   means for generating ultrasound within said sample,
   a transducer coupled to said sample to detect ultrasound and including a plurality of electrodes and a plurality of dielectric members in alternate layered arrangement with said electrodes.
   means for maintaining one of said electrodes at a reference potential,
   means for applying a bias voltage relative said reference potential to another of said electrodes,
   said ultrasound coupling to said transducer to generate voltages on the remainder of said electrodes, and
   means for combining said voltages generated on said remaining electrodes relative said reference potential to provide a measure of said ultrasound.

2. The apparatus of claim 1 wherein:
   said reference potential electrode is the electrode of said transducer adjacent said sample,
   said bias voltage electrode is the electrode of said transducer furthermost of said sample, and
   said remaining electrodes are the electrodes of said transducer between said adjacent and furthermost electrodes.

3. The apparatus according to claim 1 wherein:
   said reference potential means maintains a first and third of said electrodes adjacent said specimen at a reference potential,
   said ultrasound-generating means applies an excitation signal to a second of said electrodes mediate said first and third electrodes to generate ultrasound in said sample, and
   said bias means applies said bias voltage relative said reference potential to the electrode of said transducer furthermost of said sample.

4. The apparatus according to claim 1 wherein said sample is electrically conductive and
   said reference potential means maintains said sample at a reference potential,
   said bias means applies a bias potential relative said reference potential to one of said electrodes, and
   said combining means combines the output voltages relative said reference potential of the remainder of said electrodes to provide a measure of said ultrasound.

5. The apparatus according to claim 1 wherein said sample is electrically conductive and
   said ultrasound-generating means applies an excitation signal to a first electrode of said transducer adjacent said sample to generate ultrasound in said sample,
   said reference potential means maintains said sample and a second electrode of said transducer adjacent said excited first electrode at a reference potential,
   said bias means applies a bias voltage relative said reference potential to the electrode of said transducer furthermost of said sample, and
   said combining means combines the output voltages relative said reference potential of the remaining electrodes of said transducer to provide a measure of said ultrasound.

6. In an apparatus for ultrasonically testing a sample:
   a plurality of electrodes,
   a plurality of dielectric members in alternate layered arrangement with said electrodes, said dielectric members and electrodes being in pressure engagement with said sample,
   means for maintaining one of said electrodes at a reference potential,
   means for applying a bias voltage to another of said electrodes relative said reference potential, and
   means for combining the output voltages relative said reference potential of the remainder of said electrodes to provide a measure of ultrasound in said sample.

7. The apparatus according to claim 6 wherein:
   said reference potential electrode is adjacent said sample and is electrically grounded, said bias voltage electrode is furthermost of said sample, and said combining means comprise a plurality of amplifiers having their inputs connected to additively combine the output voltages of said remaining electrodes relative electrical ground and means for measuring the combined output voltages of said amplifiers to provide a measure of ultrasound in said sample.

8. The apparatus according to claim 6 wherein said sample is electrically conductive and said dielectric members are interposed of each of said electrodes and said sample in alternate layered arrangement and together with said electrodes in pressure engagement with said sample, said reference potential means maintain said sample at reference potential, said bias voltage means apply a bias voltage relative said sample reference potential to the one of said electrodes furthermost of said sample, and said combining means combine the output voltages relative said sample reference potential of the remainder of said electrodes to provide a measure of ultrasound in said sample.

9. An electrostatic transducer comprising a plurality of thin-film electrodes, a plurality of thin-film dielectric members in alternate-layered intimate-contact arrangement with said electrodes, and means ultrasonically coupling said electrodes to a sample.

10. The transducer of claim 9 further including a substrate and wherein said electrodes and dielectric members comprise a plurality of thin-film layers of electrode and dielectric material alternately deposited on said substrate.

11. The transducer of claim 10 wherein said electrodes have a thickness between 800 and 1500 A. and said dielectric members have a thickness between 1500 and 3000 A.